(12) United States Patent
Charnesky et al.

(10) Patent No.: US 8,302,714 B2
(45) Date of Patent: Nov. 6, 2012

(54) IMPACT AND DAMAGE RESISTANT FRONT END AIRFLOW CONTROL DEVICE

(75) Inventors: Scott P. Charnesky, Birmingham, MI (US); Horacio A. Miretti, Rochester, MI (US); Julie A. Bryce, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 12/708,844

(22) Filed: Feb. 19, 2010

(65) Prior Publication Data

US 2011/0203861 A1    Aug. 25, 2011

(51) Int. Cl.
*B60K 11/00*    (2006.01)
(52) U.S. Cl. .................... 180/68.1; 180/68.2
(58) Field of Classification Search .......... 180/68.1, 180/68.2, 68.3, 69.22; 123/41.06, 41.58, 123/568.12, 41.59, 542; 296/180.1, 180.5
See application file for complete search history.

(56) References Cited

U.S. PATENT DOCUMENTS

| 1,576,507 | A | * | 3/1926 | Eliasek | 123/41.04 |
|---|---|---|---|---|---|
| 3,762,489 | A | * | 10/1973 | Proksch et al. | 180/68.1 |
| 4,753,468 | A | * | 6/1988 | Szymczak et al. | 293/132 |
| 6,079,769 | A | * | 6/2000 | Fannin et al. | 296/180.1 |
| 7,147,269 | B2 | * | 12/2006 | Aase et al. | 296/180.1 |
| 7,498,926 | B2 | * | 3/2009 | Browne et al. | 180/68.1 |
| 7,766,111 | B2 | * | 8/2010 | Guilfoyle et al. | 180/68.1 |
| 7,784,576 | B2 | * | 8/2010 | Guilfoyle et al. | 180/68.1 |
| 8,025,045 | B2 | * | 9/2011 | Pettersson et al. | 123/568.12 |
| 2003/0029581 | A1 | * | 2/2003 | Vide | 160/201 |
| 2006/0073780 | A1 | * | 4/2006 | Motszko et al. | 454/74 |
| 2011/0132677 | A1 | * | 6/2011 | Kawahira | 180/68.1 |
| 2011/0297468 | A1 | * | 12/2011 | Coel et al. | 180/68.1 |

* cited by examiner

*Primary Examiner* — Hau Phan
(74) *Attorney, Agent, or Firm* — Quinn Law Group, PLLC

(57) ABSTRACT

An airflow control device for controlling a flow of air through a grille of a vehicle includes a sheet of flexible material. The sheet is moveable between an open position allowing airflow through the grille and a closed position blocking airflow through the grille. The sheet moves in a generally vertical path between the open position and the closed position.

11 Claims, 5 Drawing Sheets

IMPACT AND DAMAGE RESISTANT FRONT END AIRFLOW CONTROL DEVICE

TECHNICAL FIELD

The invention generally relates to an airflow control device for controlling a flow of air through a grille in the front end of a vehicle.

BACKGROUND OF THE INVENTION

Vehicles include a body, and typically include a grille disposed in the front end of the body. The grille defines at least one, but preferably a plurality of openings, through which air may flow. The air flows through the openings of the grille and across a radiator to cool an engine coolant, which in turn cools an engine of the vehicle.

In order to increase a fuel efficiency of the vehicle, some vehicles have incorporated an airflow control device adjacent to the grille to regulate the flow of air through the grille. The airflow control device moves between an open position and a closed position. The open position allows the flow of air through the grille across the radiator, and the closed position blocks the flow of air through the grille. The vehicle may move the airflow control device between the open position and the closed position under pre-determined operating conditions to optimize the fuel efficiency of the vehicle.

SUMMARY OF THE INVENTION

A vehicle includes a body having a front end, and defining a compartment. A grille is disposed in the front end of the body. The grille defines at least one opening for communicating a flow of air into the compartment. An airflow control device is coupled to the body, and is moveable between an open position and a closed position. When in the open position, the airflow control device permits the flow of air through the grille. When in the closed position, the airflow control device blocks the flow of air through the grille. The airflow control device includes a sheet of flexible material extending across a width of the grille. The sheet is moveable along a path in a substantially vertical direction between the open position and the closed position.

In another aspect of the invention, an airflow control device for controlling a flow of air through a grille in a front of a vehicle is disclosed. The airflow control device includes a sheet of flexible material moveable between an open position and a closed position. When in the open position, the airflow control device permits the flow of air through the grille. When in the closed position, the airflow control device blocks the flow of air through the grille. A motor is coupled to the sheet. The motor is configured for moving the sheet between the open position and the closed position. The sheet is moveable along a path in a substantially vertical direction between the open position and the closed position.

Accordingly, the sheet of the airflow control device moves vertically between the open and closed position, thereby minimizing the for/aft packaging requirements of the airflow control device. Additionally, because the sheet is manufactured from a flexible material, a radiator of the vehicle will not be damaged by contact from the sheet during a front impact of the vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
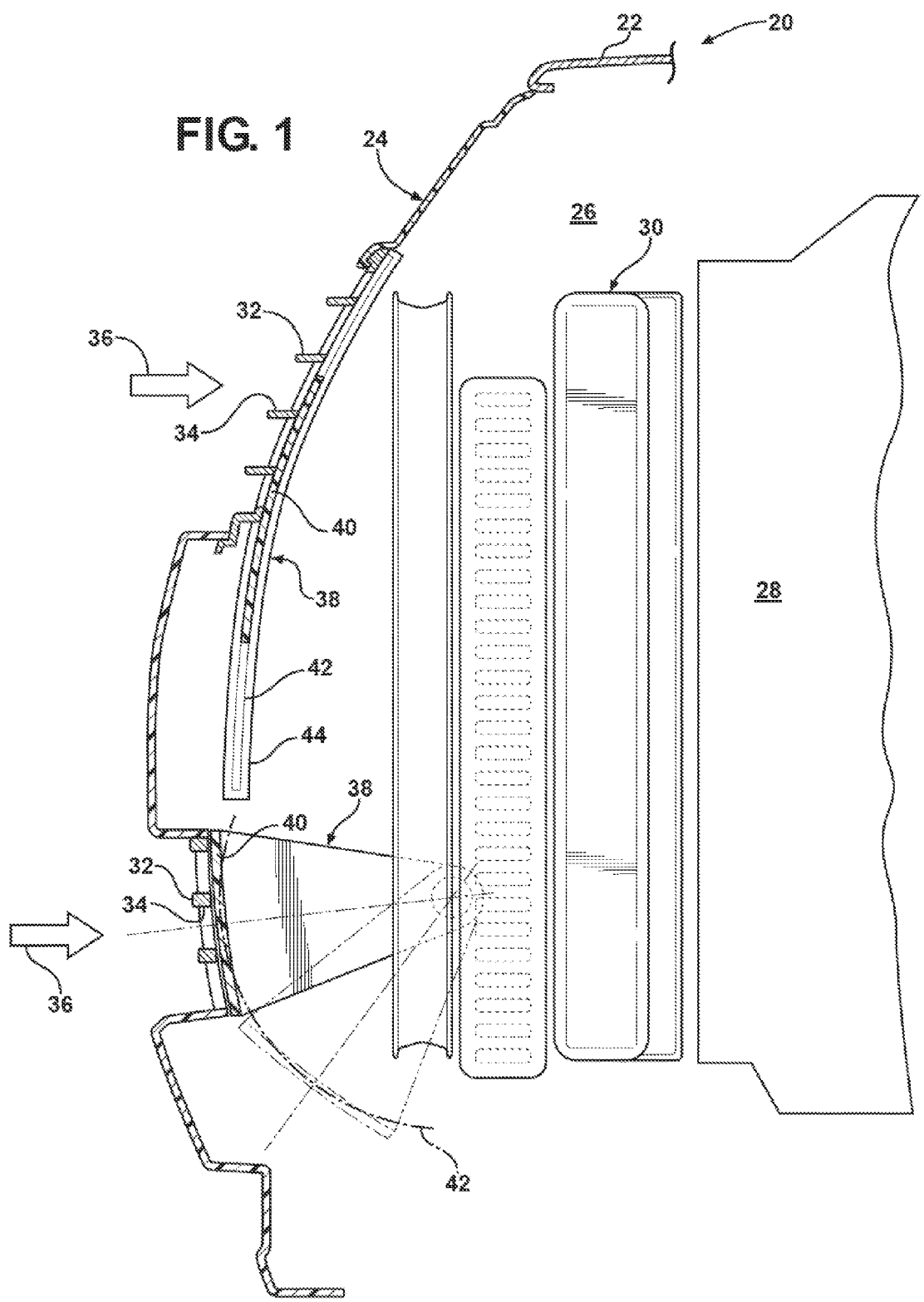
FIG. 1 is a schematic fragmentary cross section of a vehicle showing a first embodiment of an airflow control device.

Referring to the Figures, wherein like numerals indicate corresponding parts throughout the several views, a vehicle is shown generally at 20. Referring to FIG. 1, the vehicle includes a body 22, which defines a front end 24 and at least one compartment 26. The compartment 26 may include, but is not limited to, an engine 28 compartment 26. The vehicle may further include an engine 28 and a Condenser Radiator Fan Module (CRFM 30) disposed within the compartment 26. A coolant circulates between the CRFM 30 and the engine 28 to cool the engine 28 during use as is well known.

The body 22 further includes a grille 32 disposed in the front end 24 of the body 22. The grille 32 defines at least one opening 34, but preferably a plurality of opening 34s, for communicating a flow of air 36 into the compartment 26. The flow of air 36 is directed across the CRFM 30 to absorb heat from the CRFM 30, thereby cooling the coolant as is well known. The grille 32 extends across a width of the vehicle, and spans a vertical distance of the front end 24 of the body 22. The grille 32 may be configured in any suitable shape, size and/or configuration to fit the vehicle. The opening 34s may be arranged in any desirable manner, and may include any suitable shape, size and/or configuration to provide the required flow of air 36 to the CRFM 30. Additionally, the grille 32 may include, but is not limited to, an upper grille 32 and/or an independent and separate lower grille 32. For example, the grille 32 may include the upper grille 32 disposed vertically above a bumper of the vehicle, and the lower grille 32 disposed vertically below the bumper of the vehicle. It should be appreciated, however, that the grille 32 need only include a single grille 32, and is not limited to including both the upper grille 32 and the lower grille 32.

The vehicle further includes an airflow control device 38. The airflow control device 38 is coupled to the body 22 and/or the vehicle. The airflow control device 38 is moveable between an open position and a closed position. When in the open position, the airflow control device 38 permits the flow of air 36 through the grille 32. When in the closed position, the airflow control device 38 blocks the flow of air 36 through the grille 32. By selectively moving the airflow control device 38 between the open position and the closed position, the vehicle may optimize performance and fuel efficiency of the engine 28 to the existing driving, engine 28 and/or environmental conditions.

The airflow control device 38 includes a sheet 40 of flexible material, which extends across the width of the grille 32. The sheet 40 of flexible material includes a height equal to or greater than the vertical span of the grille 32. The flexible material may include, but is not limited to, polypropylene, masticated rubber, thermoplastic vulcanizate, textile laminates and polyvinyl chloride. The sheet 40 is moveable along a path 42 in a vertical direction between the open position and the closed position. Accordingly, the sheet 40 moves vertically when moving between the open position and the closed position. The sheet 40 of flexible material extends vertically across the vertical span of the grille 32 when in the closed position to substantially block airflow through the opening 34 of the grille 32. The sheet 40 of flexible material is vertically offset relative to the grille 32 when in the open position to allow airflow through the opening 34 of the grille 32. The path 42 that the sheet 40 follows, when viewed along a longitudinal cross section of the vehicle extending from the front of the vehicle to a rear of the vehicle, may include, but is not limited to, one of a semi-circular path 42 or a linear path 42. In other words, when moving between the open position and the closed position, the sheet 40 may follow one of a semi-circular path 42 or a linear path 42.

Figure 2:
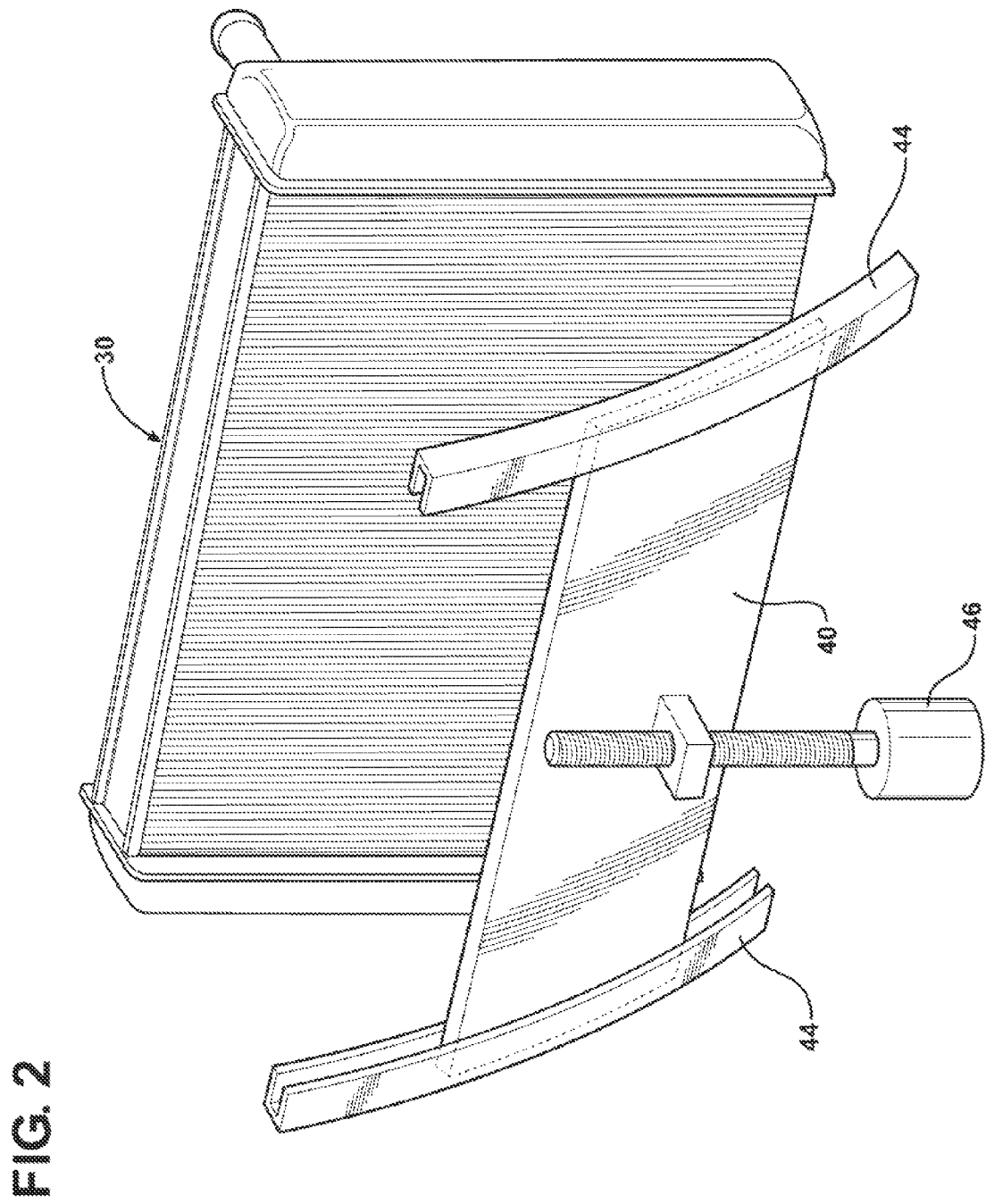
FIG. 2 is a schematic front plan view of the first embodiment of the airflow device.

Referring also to FIG. 2, the airflow control device 38 may further include a track 44, wherein a lateral edge of the sheet 40 is disposed within and guided by the track 44 along the path 42. Preferably, the track 44 includes a first track 44 and a second track 44 disposed on opposing edges of the sheet 40, i.e., a left track 44 and a right track 44 supporting a left edge and a right edge of the sheet 40 respectively. The track 44 may be attached to the body 22 and/or the vehicle in any suitable manner. It should be appreciated that the track 44 and the lateral edge of the sheet 40 may be configured in any suitable shape and/or configuration to ensure sliding engagement between the sheet 40 and the track 44, and to prevent separation of the sheet 40 from the track 44.

The airflow control device 38 may further include a motor 46. The motor 46 is coupled to the sheet 40, and may be attached to the body 22 and/or the vehicle in any suitable manner. The motor 46 is configured for moving the sheet 40 between the open position and the closed position. The motor 46 may include any suitable motor 46 capable of moving the sheet 40. For example, the motor 46 may include, but is not limited to, an electric motor 46, a pneumatic motor 46 or a hydraulic motor 46.

The motor 46 may be coupled to the sheet 40 in any manner capable of engaging and moving the sheet 40. For example, the motor 46 may include a rotatable gear and the sheet 40 may include a geared rack in meshing engagement with the rotating gear of the motor 46. As such, rotational movement of the rotating gear of the motor 46 may be converted into movement of the sheet 40 along the path 42. It should be appreciated that the motor 46 may be coupled to and act to move the sheet 40 in some other manner not described or shown herein.

Figure 3:
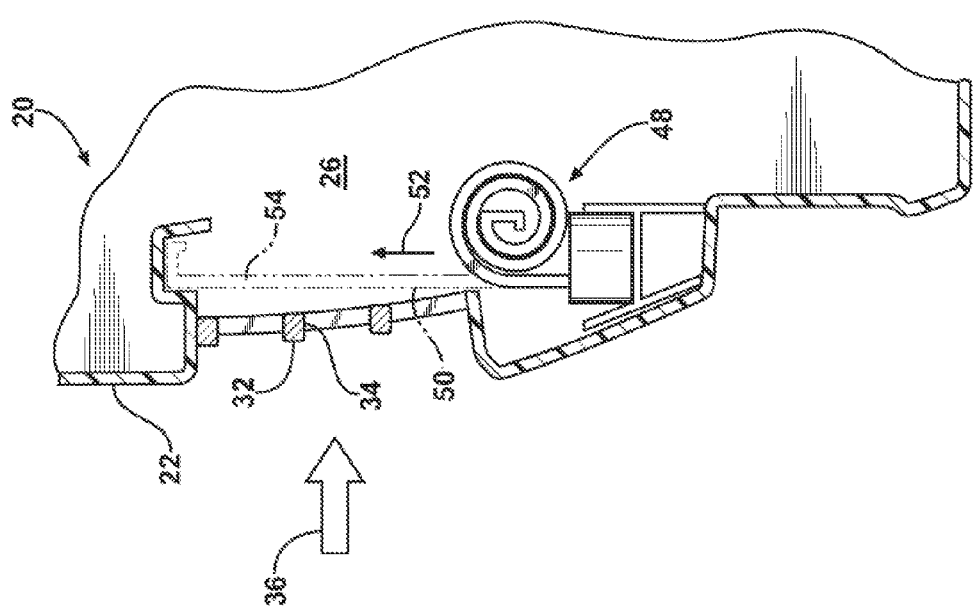
FIG. 3 is a schematic fragmentary cross section of the vehicle showing a second embodiment of the airflow control device.

Referring to FIG. 3, a second alternative embodiment of the airflow control device is shown generally at 48. The second alternative embodiment of the airflow control device 48 includes a sheet 50 of flexible material, which extends across the width of the grille 32. The flexible material may include, but is not limited to, polypropylene, masticated rubber, thermoplastic vulcanizate, textile laminates and polyvinyl chloride. The sheet 50 is moveable along a path 52 in a vertical direction between the open position and the closed position. Accordingly, the sheet 50 moves vertically when moving between the open position and the closed position.

The sheet 50 of the second alternative embodiment of the airflow control device 48 includes a bladder 54, which is expandable from a compressed condition when in the open position to an expanded condition when in the closed position. As such, the sheet 50 expands into the expanded position to move from the open position into the closed position, thereby blocking the opening 34s of the grille 32. The sheet 50 contracts into the compressed position to move from the closed position into the open position, thereby permitting the flow of air 36 through the grill and across the CRFM 30.

Figure 4:
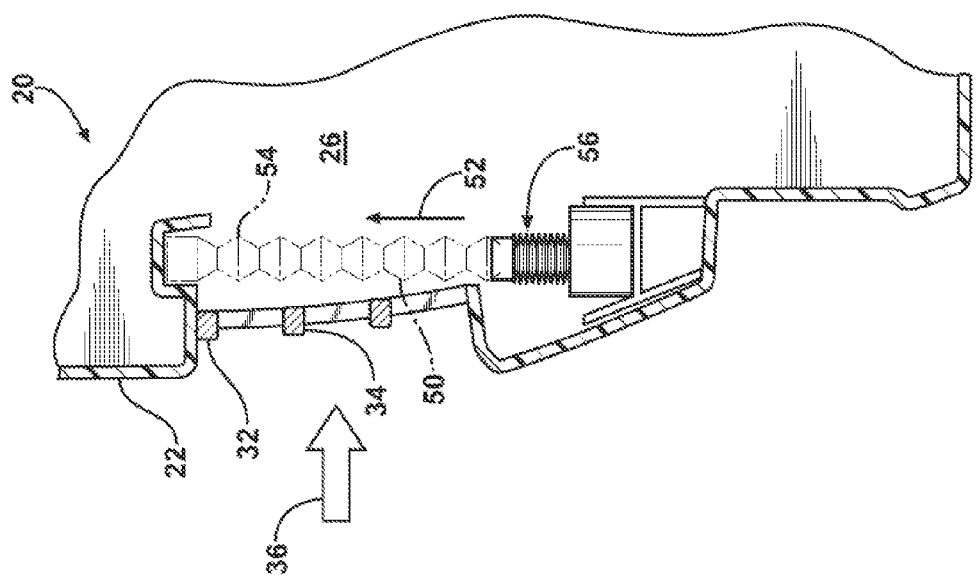
FIG. 4 is a schematic fragmentary cross section of the vehicle showing a third embodiment of the airflow control device.

The bladder 54 may include a coil bladder 54 as shown in the second alternative embodiment of the airflow control device 48 of FIG. 3. Alternatively, the bladder 54 may include an accordion bladder 54 as shown in a third alternative embodiment of the airflow device shown generally at 56 in FIG. 4.

Figure 5:
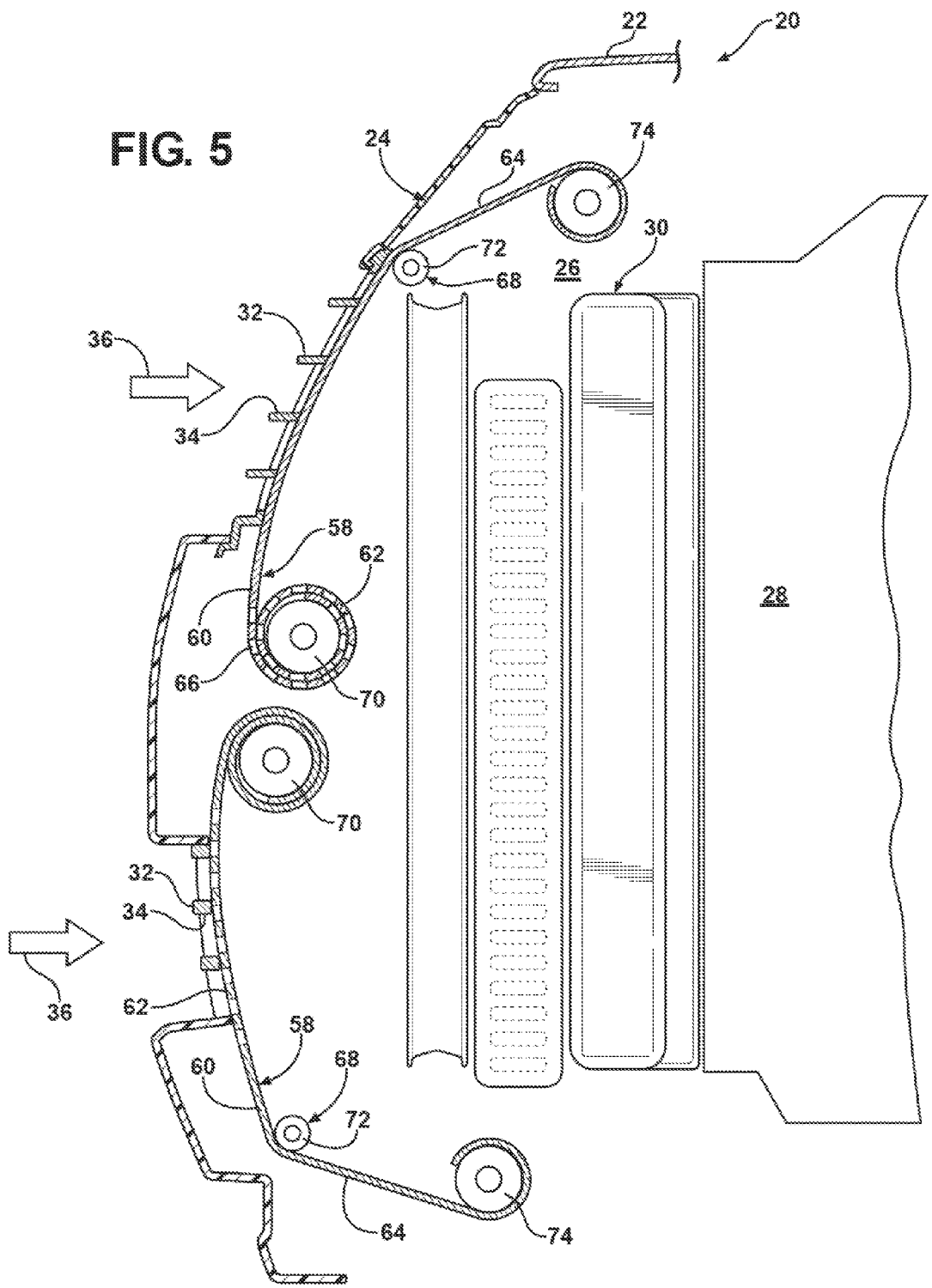
FIG. 5 is a schematic fragmentary cross section of the vehicle showing a fourth embodiment of the airflow control device.

Referring to FIG. 5, a fourth alternative embodiment of the airflow control device is shown generally at 58. The fourth alternative embodiment of the airflow control device 58 includes a sheet 60 of flexible material that extends across the width of the grille 32. The flexible material may include, but is not limited to, polypropylene, masticated rubber, thermoplastic vulcanizate, textile laminates and polyvinyl chloride. The sheet 60 includes a first portion 62 and a second portion 64. The first portion 62 defines a plurality of vents 66. The second portion 64 includes a solid portion, i.e., the second portion 64 does not include any vents 66. The sheet 60 of the fourth alternative embodiment of the airflow control device 58 moves to position either the first portion 62 or the second portion 64 of the sheet 60 adjacent the grille 32. When in the open position, the first portion 62 of the sheet 60 with the plurality of vents 66 is positioned adjacent the grille 32 to permit the flow of air 36 through the grille 32, through the plurality of vents 66 and across the CRFM 30. When in the closed position, the second portion 64 of the sheet 60, i.e., the solid portion, is positioned adjacent the grille 32 to block the flow of air 36 through the grille 32.

The fourth embodiment of the airflow control device 58 further includes a roller system 68. The roller system 68 is configured for winding the sheet 60 to position the first portion 62 adjacent the grille 32 and conceal the second portion 64 when in the open position, and position the second portion 64 adjacent the grille 32 and conceal the first portion 62 when in the closed position. As shown, the roller system 68 includes a first roller 70, a second or idler roller 72, and a third roller 74. The first roller 70 winds the first portion 62 of the sheet 60, thereby drawing the second portion 64 of the sheet 60 across the idler roller 72 until adjacent the grille 32. Similarly, the third roller 74 winds the second portion 64 of the sheet 60, thereby unwinding the first portion 62 from the first roller 70 until adjacent the grille 32. The roller system 68 may include one more motor 46s coupled to the first and/or third roller 74s for actuating the rollers. It should be appreciated that the roller system 68 may be configured in some other manner not shown or described herein.

Figure 6:
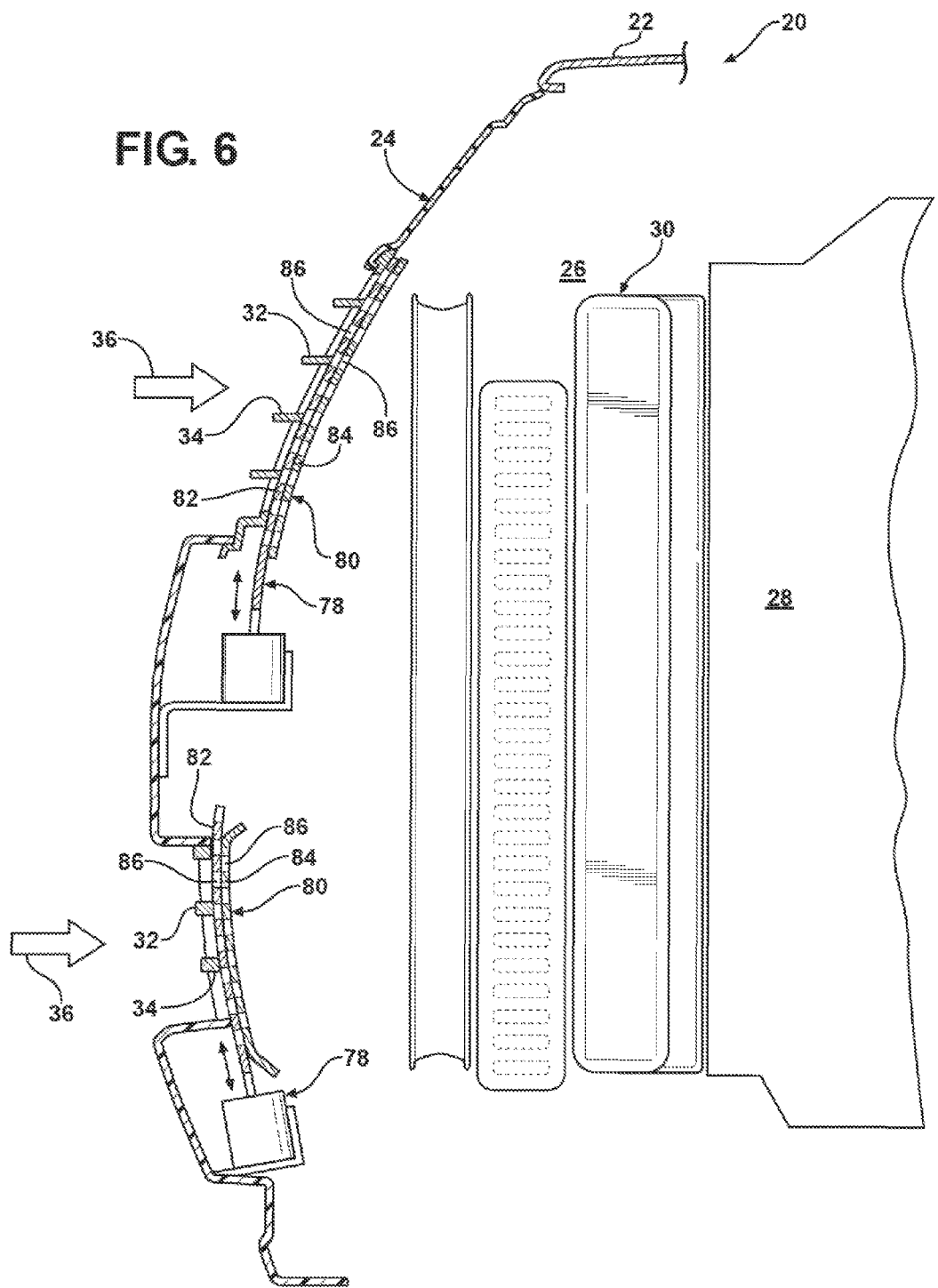
FIG. 6 is a schematic fragmentary cross section of the vehicle showing a fifth embodiment of the airflow control device.

Referring to FIG. 6, a fifth alternative embodiment of the airflow control device is shown generally at 78. The fifth alternative embodiment of the airflow control device 78 includes a sheet 80 of flexible material that extends across the width of the grille 32. The flexible material may include, but is not limited to, polypropylene, masticated rubber, thermoplastic vulcanizate, textile laminates and polyvinyl chloride. The sheet 80 includes a first member 82 and a second member 84. The second member 84 is disposed in parallel relationship with the first member 82. Each of the first member 82 and the second member 84 defines a plurality of vents 86. At least one of the first member 82 and the second member 84 is moveable relative to the other of the first member 82 and the second member 84. The first member 82 and the second member 84 move relative to each other to align the plurality of vents 86 in the first member 82 with the plurality of vents 86 in the second member 84 when in the open position, and to offset the plurality of vents 86 in the first member 82 from the plurality of vents 86 in the second member 84 when in the closed position. When in the open position with the plurality of vents 86 in the first member 82 aligned with the plurality of vents 86 in the second member 84, the flow of air 36 is permitted to pass through the plurality of aligned vents 86 in the first member 82 and the second member 84, across the CRFM 30. When in the closed position with the plurality of vents 86 in the first member 82 offset from the plurality of vents 86 in the second member 84, i.e., the vents 86 are not aligned, then the flow of air 36 is blocked from passing through the sheet 80.

The first member 82 and the second member 84 may be a single sheet 80. Alternatively, the first member 82 and the second member 84 may include separate and independent sheet 80s. The fifth alternative embodiment of the airflow control device 78 may further include a motor 46 coupled to one or both of the first member 82 and the second member 84 to move one or both of the first member 82 and the second member 84 relative to each other. The motor 46 may include any suitable type of motor 46, including but not limited to, an electric motor 46, a pneumatic motor 46 or a hydraulic motor 46.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body having a front end and defining a compartment;
a grille disposed in said front end of said body and defining at least one opening for communicating a flow of air into said compartment; and
an airflow control device coupled to said body and moveable between an open position permitting the flow of air through said grille and a closed position blocking the flow of air through said grille;
said airflow control device including a sheet of flexible material extending across a width of said grille and having a height equal to or greater than a vertical span of said grille;
wherein said sheet of flexible material is moveable along a path in a substantially vertical direction between said open position and said closed position such that said sheet of flexible material extends vertically across said vertical span of said grille when in said closed position to substantially block airflow through said opening of the grille, and wherein said sheet of flexible material is vertically offset relative to said grille when in said open position to allow airflow through said opening of said grille.

2. A vehicle as set forth in claim 1 wherein said flexible material includes a material from a group of materials including: polypropylene, masticated rubber, thermoplastic vulcanizate, textile laminates and polyvinyl chloride.

3. A vehicle as set forth in claim 2 wherein said airflow control device further includes a motor coupled to said sheet and configured for moving said sheet between said open position and said closed position.

4. A vehicle as set forth in claim 3 wherein said sheet includes a geared rack in meshing engagement with said motor for converting rotational movement of said motor into linear movement of said sheet.

5. A vehicle as set forth in claim 2 further comprising a track and wherein said sheet includes a lateral edge disposed within and guided by said track along said path.

6. A vehicle as set forth in claim 5 wherein said path includes one of a semi-circular path and a linear path.

7. A vehicle as set forth in claim 2 wherein said sheet includes a bladder expandable from a compressed condition when in said open position to an expanded condition when in said closed position.

8. A vehicle as set forth in claim 7 wherein said bladder includes one of a coil bladder and an accordion bladder.

9. A vehicle as set forth in claim 2 wherein said sheet includes a first portion defining a plurality of vents and a solid second portion.

10. A vehicle as set forth in claim 9 wherein said airflow control device further includes a roller system configured for winding said sheet to position said first portion adjacent said grille and conceal said second portion when in said open position and position said second portion adjacent said grille and conceal said first portion when in said closed position.

11. A vehicle as set forth in claim 2 wherein said sheet includes a first member and a second member disposed in parallel relationship with said first member, with each of said first member and said second member defining a plurality of vents, wherein at least one of said first member and said second member are moveable relative to the other of said first member and said second member to align said plurality of vents in said first member with said plurality of vents in said second member when in said open position, and to offset said plurality of vents in said first member from said plurality of vents in said second member when in said closed position.

* * * * *